(12) United States Patent
Liang et al.

(10) Patent No.: US 10,626,228 B2
(45) Date of Patent: Apr. 21, 2020

(54) LITHIUM SALT / POLYACRYLONITRILE / THERMOSETTING RESIN COMPOSITES AND PREPARATION METHOD THEREOF

(71) Applicant: SOOCHOW UNIVERSITY, Suzhou (CN)

(72) Inventors: Guozheng Liang, Suzhou (CN); Sheng Sun, Suzhou (CN); Aijuan Gu, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 13 days.

(21) Appl. No.: 16/070,272

(22) PCT Filed: Nov. 29, 2016

(86) PCT No.: PCT/CN2016/107800
§ 371 (c)(1),
(2) Date: Jul. 13, 2018

(87) PCT Pub. No.: WO2017/121205
PCT Pub. Date: Jul. 20, 2017

(65) Prior Publication Data
US 2019/0144614 A1 May 16, 2019

(30) Foreign Application Priority Data

Jan. 16, 2016 (CN) .......................... 2016 1 0027257

(51) Int. Cl.
| | | |
|---|---|---|
| C08L 33/20 | (2006.01) |
| C08J 3/20 | (2006.01) |
| C08K 3/32 | (2006.01) |
| C08K 3/38 | (2006.01) |
| C08L 63/10 | (2006.01) |
| C08K 5/42 | (2006.01) |
| C08L 63/00 | (2006.01) |
| C08K 3/24 | (2006.01) |
| C08J 3/00 | (2006.01) |
| C08J 5/18 | (2006.01) |
| C08K 3/16 | (2006.01) |
| C08K 5/3445 | (2006.01) |
| C08K 5/41 | (2006.01) |
| C08K 5/435 | (2006.01) |

(52) U.S. Cl.
CPC ................ *C08J 3/20* (2013.01); *C08J 3/005* (2013.01); *C08J 5/18* (2013.01); *C08K 3/16* (2013.01); *C08K 3/24* (2013.01); *C08K 3/32* (2013.01); *C08K 3/38* (2013.01); *C08K 5/3445* (2013.01); *C08K 5/41* (2013.01); *C08K 5/42* (2013.01); *C08K 5/435* (2013.01); *C08L 33/20* (2013.01); *C08L 63/00* (2013.01); *C08L 63/10* (2013.01); *C08J 2333/20* (2013.01); *C08J 2463/00* (2013.01); *C08K 2003/324* (2013.01); *C08K 2003/387* (2013.01)

(58) Field of Classification Search
None
See application file for complete search history.

(56) References Cited

U.S. PATENT DOCUMENTS 6,299,790 B1 * 10/2001 Kono .................... H01G 11/56
252/62.2

FOREIGN PATENT DOCUMENTS

| CN | 102216391 A | 10/2011 |
| CN | 102775626 A | 11/2012 |
| CN | 103351581 A | 10/2013 |
| CN | 105482339 A | 4/2016 |
| JP | 2000319531 | * 11/2000 |
| JP | 2004210936 A | 7/2004 |
| JP | 2004210941 A | 7/2004 |
| JP | 2006056981 A | 3/2006 |

* cited by examiner

*Primary Examiner* — David J Buttner
(74) *Attorney, Agent, or Firm* — SZDC Law PC

(57) ABSTRACT

Disclosed are a lithium salt/polyacrylonitrile/thermosetting resin composite material and a preparation method therefor. 100 parts of polyacrylonitrile and 550-1100 parts of N,N-dimethyl formamide by mass are stirred at a temperature of 25° C.-80° C., and a uniform and transparent polyacrylonitrile solution is obtained; further, 8-36 parts of a lithium salt is added; and the mixture is stirred until a uniform and transparent lithium salt/polyacrylonitrile solution is obtained. A heat-curable resin is added to the lithium salt/polyacrylonitrile solution, and is uniformly mixed. The obtained composite solution is made into a film, and a lithium salt/polyacrylonitrile/thermosetting resin composite material is then obtained after curing and post-treatment. The lithium salt/polyacrylonitrile/thermosetting resin composite material has the advantages of a high dielectric constant and a good flexibility and transparency, and the preparation method of the composite material has the characteristics of a simple operation process, low manufacturing cost and wide applicability.

5 Claims, 3 Drawing Sheets

LITHIUM SALT / POLYACRYLONITRILE / THERMOSETTING RESIN COMPOSITES AND PREPARATION METHOD THEREOF

This application is a nation stage of PCT/CN2016/107800, filed on Nov. 29, 2016, which claims priority to Chinese Patent Application No. 201610027257.5, filed Jan. 16, 2016, which is incorporated by reference for all purposes as if fully set forth herein.

FIELD OF THE INVENTION

The present invention relates to a kind of polymer composites and preparation method thereof, in particular to a lithium salt/polyacrylonitrile/thermosetting resin composites and preparation method thereof.

BACKGROUND OF THE INVENTION

Polymer matrix composites with high dielectric permittivity show great application prospect in microelectronics, biological engineering, electrical engineering, aerospace and other cutting-edge technologies, it has become a hot topic in material science. In recent years, transparent and flexible materials have attracted a lot of interest, especially in the fields of microelectronics and bioengineering. However, there have been no reports of transparent polymer matrix composites with high dielectric permittivity so far.

According to the types of fillers, high dielectric permittivity polymer matrix composites are roughly divided into ceramic/polymer composites and conductor/polymer composites. These two kinds of materials have their own characteristics and shortcomings. In general, 50 vol % or more ceramics should be added to achieve high dielectric permittivity, this usually not only brings degraded manufacturability and flexibility of composites; but also cannot produce materials with high transparency. Above problems are avoided in electric conductor/polymer composites; however, conductors are not transparent, and easy to aggregate in a polymer matrix, so the corresponding high dielectric permittivity polymer matrix composites do not have optical transparency; Note that conductor/polymer composites show high dielectric permittivity as the loading of conductors is close to the percolation threshold; however, at the same time, the composites also exhibit high dielectric loss.

Therefore, it is of great scientific significance and practical value to develop novel multifunctional high dielectric permittivity composite films with high transparency and flexibility through a simple and feasible method.

SUMMARY OF THE INVENTION

The present invention deals with solving problems of available technologies, to provide a kind of lithium salt/polyacrylonitrile/thermosetting resin composite with high transparency, high dielectric permittivity, good flexibility and low dielectric loss, and preparation method thereof.

To achieve above purpose, the present invention adopts the following technical solution:

A preparation method of lithium salt/polyacrylonitrile/thermosetting resin composites wherein comprising the following steps:

(1) by mass, 100 parts of polyacrylonitrile and 500 to 1100 parts of N,N-dimethylformamide are stirred at 25 to 80° C. to obtain a uniform and transparent polyacrylonitrile solution A; 8 to 36 parts of a lithium salt are added into the polyacrylonitrile solution A, and the mixture is stirred at 25 to 80° C. until a uniform and transparent lithium salt/polyacrylonitrile solution is obtained;

(2) a heat-curable resin is added into the lithium salt/polyacrylonitrile solution prepared by step (1), and mixed uniformly at a temperature of 15 to 50° C. to obtain a composite solution; after the composite solution is made into a thin film, it is further cured and post-processed to obtain a lithium salt/polyacrylonitrile/thermosetting resin composite.

In present invention, said lithium salt includes one selected from lithium trifluoromethane sulfonate, lithium bis(trifluoromethane sulfonimide), lithium tetrafluoroborate, lithium hexafluorophosphate, lithium perchlorate.

Said heat-curable resin is one or more selected from epoxy resin comprising a curing agent or epoxy acrylate resin. Said curing agent is 2-ethyl-4-methylimidazole.

The technical solution of the present invention also comprises a kind of lithium salt/polyacrylonitrile/thermosetting resin composites prepared by above mentioned preparation method.

In the obtained thermosetting resin composite, the mass ratio of thermosetting resin to polyacrylonitrile is 20-50:100

Compared with the prior arts, this invention has following advantages:

1. Different from the existing art, this invention uses polyacrylonitrile and thermosetting resin to form a compatible resin matrix while achieving good dispersion of the lithium salt throughout the matrix with the aid of good compatibility between the lithium salt with polyacrylonitrile, and thus composites obtained excellent transparence. This greatly expands the application range of high dielectric permittivity composites, so that composite can be applied in conditions that require high transparency.

2. Different from the existing art, in this invention, polymer electrolyte is prepared by using lithium salt and polyacrylonitrile resin, where thermosetting resin is uniformly dispersed therein, and the conductive network is cut off to form many micro-capacitors that are uniformly distributed in the resin matrix, this is advantageous to increase dielectric permittivity and decrease dielectric loss.

3. This invention uses lithium salts as functional filler, only 8 wt %-13 wt % addition of lithium salts can endow composites with high dielectric permittivity; in addition, the good compatibility and dispersibility of lithium salt and resin ensure the good flexibility of composites.

4. The lithium salt used in the present invention can be dissolved in the matrix resin, so the thickness of the prepared composite is not limited by the lithium salt. In addition, there are limited dimensions for traditional inorganic conductors or ceramics to get good dispersal in a polymer matrix, so the thicknesses of the composites are limited by the dimensions of these inorganic particles.

5. Although the composites contain thermosetting resin, using the multi-component polymer as the matrix, so the prepared composites have good flexibility.

6. The preparing process of the lithium salt/polyacrylonitrile/thermosetting resin composite provided by this invention has the advantages of simple operation process, low manufacturing cost and wide applicability.

DETAILED DESCRIPTION OF THE INVENTION

The technical solution of this invention is further described by combining drawings, embodiments and control examples as follows.

Embodiment 1

1) Preparation of Lithium Trifluoromethane Sulfonate/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium trifluoromethane sulfonate was added into the polyacrylonitrile solution (A) with stirring for 2 h at 60° C. to obtain a uniform and transparent lithium trifluoromethane sulfonate/polyacrylonitrile solution.

2) Preparation of Lithium Trifluoromethane Sulfonate/Polyacrylonitrile/Epoxy Resin Composite 1.65 g epoxy resin (the commercial code is E-51) was stirred for 30 min at 60° C., and then blended with 0.066 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 25° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 33:18:100. The digital photo, transmittance-wavelength curve, digital photo, dielectric permittivity-frequency curve, AC conductivity-frequency curve and dielectric loss-frequency curve of the composite are shown in FIGS. 1, 2, 3, 4, 5 and 6, respectively.

Figure 1:
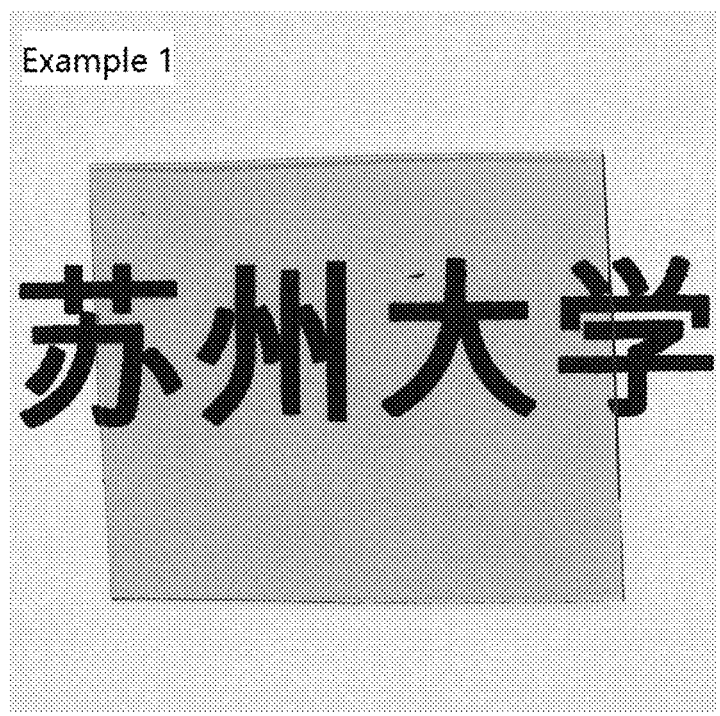
FIG. 1 is a digital photo of lithium trifluoromethane sulfonate/polyacrylonitrile/epoxy resin composite with excellent transparency prepared in Embodiment 1 of this invention.
Figure 2:
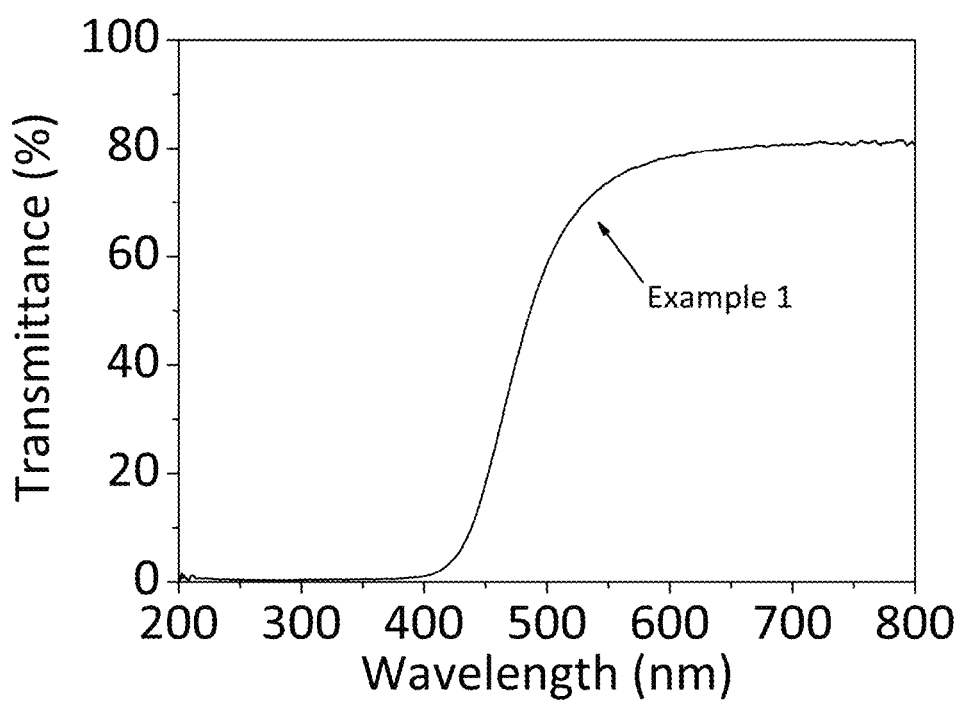
FIG. 2 is transmittance-wavelength curve of lithium trifluoromethane sulfonate/polyacrylonitrile/epoxy resin composite with excellent transparency prepared in Embodiment 1 of this invention.

As shown in FIG. 1, it is a digital photo of lithium trifluoromethane sulfonate/polyacrylonitrile/epoxy resin composite with excellent transparency prepared in Embodiment 1 of this invention. The composite is covered on the words, it can be directly seen that lithium trifluoromethane sulfonate/polyacrylonitrile/epoxy resin composite has excellent transparency. As shown in FIG. 2, it is transmittance-wavelength curve of lithium trifluoromethane sulfonate/polyacrylonitrile/epoxy resin composite with excellent transparency prepared in Embodiment 1 of this invention; it is shown that the transmittance is 80%, indicating that the preparation of lithium trifluoromethane sulfonate/polyacrylonitrile/epoxy resin composite has excellent transparency, besides, which also shows that the composite is homogeneous.

Figure 3:
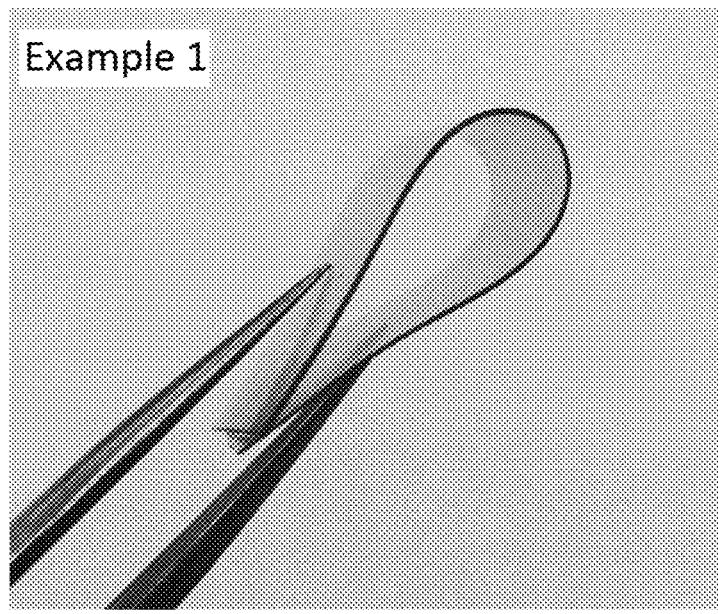
FIG. 3 is a digital photo of lithium trifluoromethane sulfonate/polyacrylonitrile/epoxy resin composite with good flexibility prepared in Embodiment 1 of this invention.

As shown in FIG. 3, it is a digital photo of lithium trifluoromethane sulfonate/polyacrylonitrile/epoxy resin composite with good flexibility prepared in Embodiment 1 of this invention; It can be seen that the composite can be bent freely without breaking, exhibiting excellent flexibility.

Embodiment 2

1) Preparation of Lithium Trifluoromethane Sulfonate/Polyacrylonitrile Solution

Solution of lithium trifluoromethanesulfonate/polyacrylonitrile was prepared according to the Embodiment 1.

2) Preparation of Lithium Trifluoromethane Sulfonate/Polyacrylonitrile/Epoxy Resin Composite 1.75 g epoxy resin (The commercial code is E-51) was stirred for 30 min at 60° C., and then blended with 0.07 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 25° C. for 12 h to produce a uniform and transparent lithium trifluoromethane sulfonate/polyacrylonitrile/epoxy resin solution.

Figure 4:
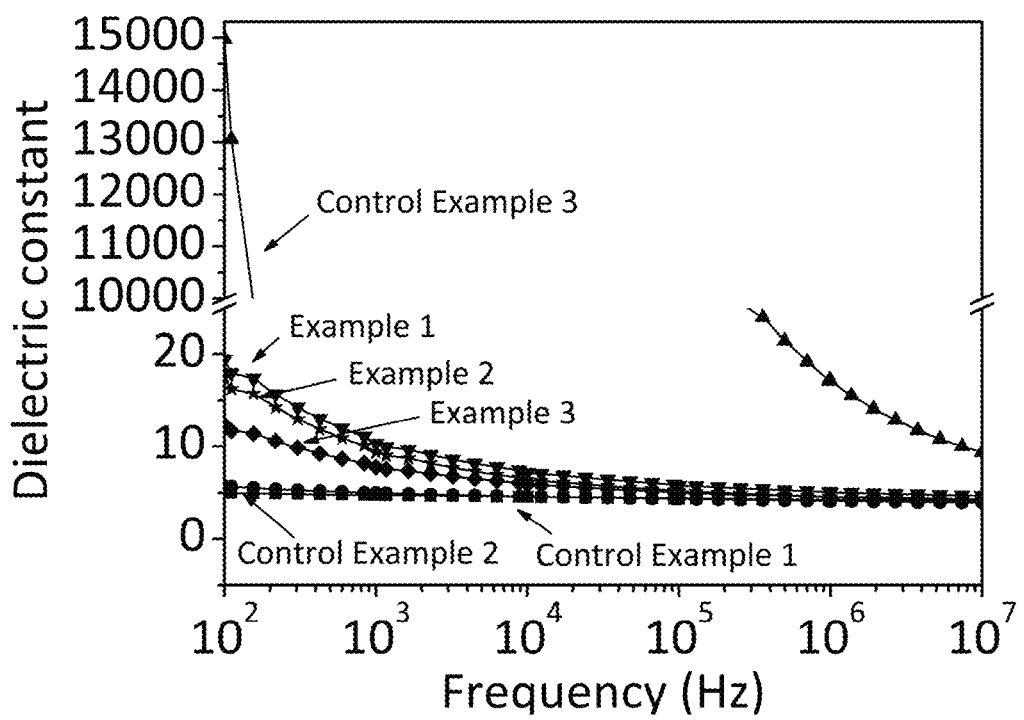
FIG. 4 is overlay plots of dielectric permittivities at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention.
Figure 5:
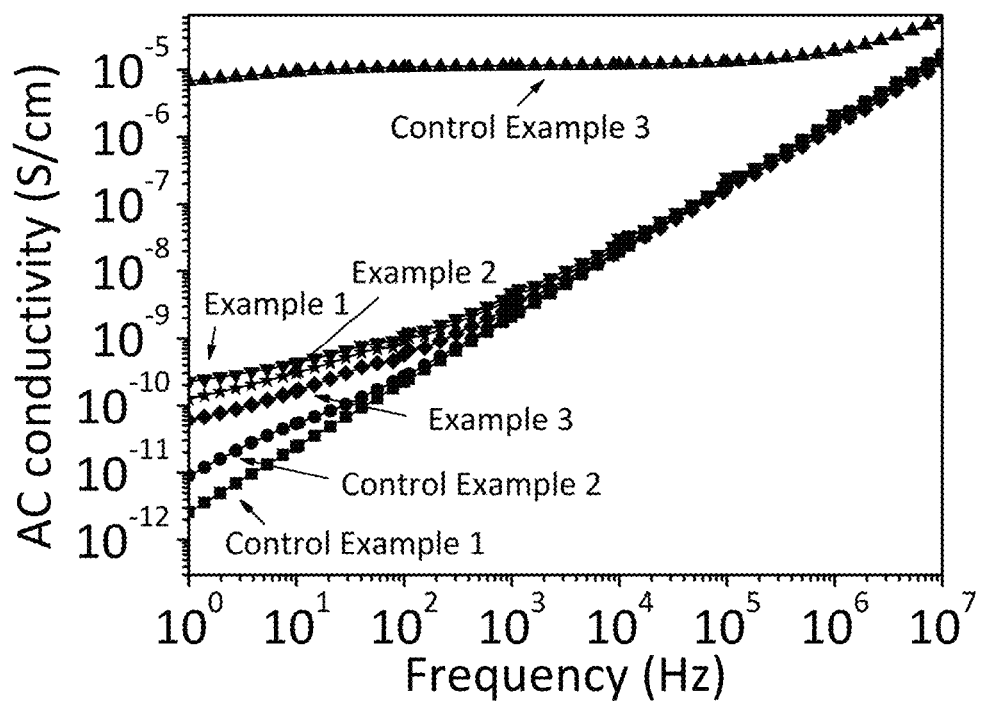
FIG. 5 is overlay plots of AC electrical conductivities at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention.
Figure 6:
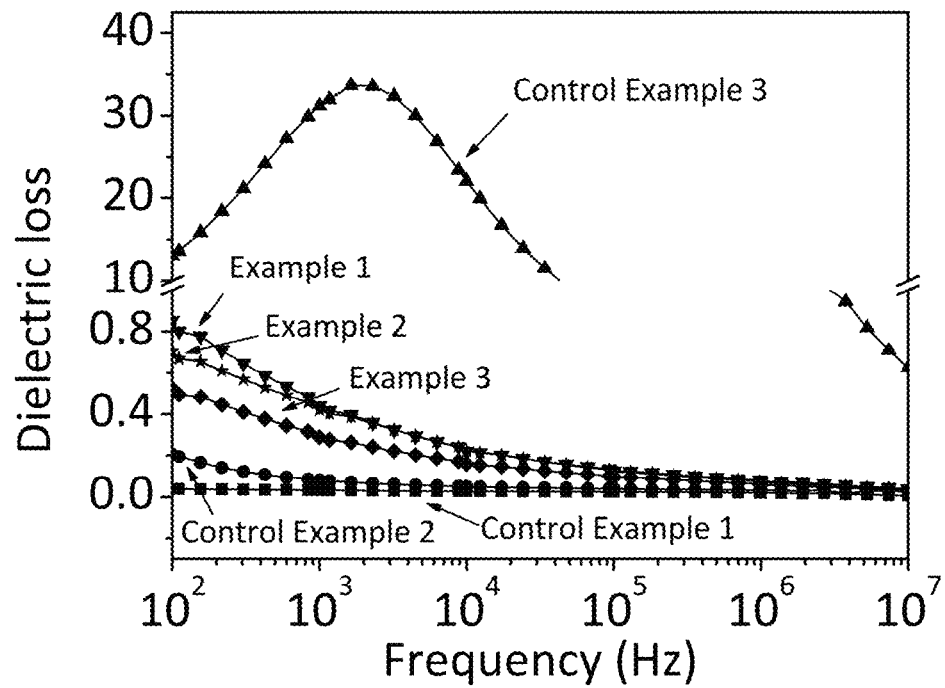
FIG. 6 is overlay plots of dielectric loss at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention.

The lithium trifluoromethane sulfonate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 35:18:100. The dielectric permittivity-frequency curve, AC conductivity-frequency curve and dielectric loss-frequency curve of the composite are shown in FIGS. 4, 5 and 6, respectively.

Embodiment 3

1) Preparation of Lithium Trifluoromethane Sulfonate/Polyacrylonitrile Solution

Solution of lithium trifluoromethanesulfonate/polyacrylonitrile was prepared according to the Embodiment 1.

2) Preparation of Lithium Trifluoromethane Sulfonate/Polyacrylonitrile/Epoxy Resin Composite 1.9 g epoxy resin(The commercial code is E-51) was stirred for 30 min at 60° C., and then blended with 0.076 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 25° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 38:18:100. The dielectric permittivity-frequency curve, AC conductivity-frequency curve and dielectric loss-frequency curve of the composite are shown in FIGS. 4, 5 and 6, respectively.

The Control Example 1, 2 and 3 were prepared for further demonstrating the properties and effects of the lithium salt/polyacrylonitrile/thermosetting resin composite provided by the technical solution of this invention. The dielectric permittivity, AC conductivity and dielectric loss were compared, The results are shown in FIGS. 4, 5 and 6, respectively.

CONTROL EXAMPLE 1

1) Preparation of Polyacrylonitrile Solution 5 g polyacrylonitrile and 50 mL N,N-dimethylformamide were blended with stirring for 2 h at 60° C. to get a uniform and transparent polyacrylonitrile solution 2) Preparation of Polyacrylonitrile/Epoxy Resin Blend 1.65 g epoxy resin (The commercial code is E-51) was stirred for 30 min at 60° C., and then blended with 0.07 g 2-ethyl-4-methylimidazole with stirring for 10 min to get a uniform and transparent epoxy resin mixture, into which polyacrylonitrile solution prepared by step (1) was added with stirring at 25° C. for 12 h to produce a uniform and transparent polyacrylonitrile/epoxy resin solution.

The polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and polyacrylonitrile/epoxy resin composite was obtained. The weight ratio of epoxy resin to polyacrylonitrile is 33:100. The dielectric permittivity-frequency curve, AC conductivity-frequency curve and dielectric loss-frequency curve are shown in of the composite FIGS. 4, 5 and 6, respectively.

CONTROL EXAMPLE 2

1) Preparation of Epoxy Resin Solution 5 g epoxy resin (The commercial code is E-51) was stirred for 30 min at 60° C., and then blended with 0.2 g 2-ethyl-4-methylimidazole with stirring for 10 min to get a uniform and transparent epoxy resin mixture. The epoxy resin mixture and 50 mL N,N-dimethylformamide were blended with stirring for 10 min at 25° C. to get a uniform and transparent epoxy resin solution 2) Preparation of Lithium Trifluoromethane Sulfonate/Epoxy Resin Composite 0.9 g lithium trifluoromethane sulfonate was added into the epoxy resin prepared by step (1) with stirring for 12 h at 25° C. to obtain a uniform and transparent lithium trifluoromethane sulfonate/epoxy resin solution.

The lithium trifluoromethane sulfonate/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium trifluoromethane sulfonate/epoxy resin composite was obtained. The weight ratio of lithium trifluoromethane sulfonate to epoxy resin is 18:100. The dielectric permittivity-frequency curve, AC conductivity-frequency curve and dielectric loss-frequency curve are shown in of the composite FIGS. 4, 5 and 6, respectively.

CONTROL EXAMPLE 3

1) Preparation of Polyacrylonitrile Solution 5 g polyacrylonitrile and 50 mL N,N-dimethylformamide were blended with stirring for 2 h at 60° C. to get a uniform and transparent polyacrylonitrile solution 2) Preparation of Lithium Trifluoromethane Sulfonate/Polyacrylonitrile Composite 0.9 g lithium trifluoromethane sulfonate was added into the polyacrylonitrile solution with stirring for 2 h at 60° C. to obtain a uniform and transparent lithium trifluoromethane sulfonate/polyacrylonitrile solution, followed by continually stirring at 25° C. for 12 h. The lithium trifluoromethane sulfonate/polyacrylonitrile solution was poured into a mold through tape casting, and the solvent was total volatilized under vacuum at 25° C., and lithium trifluoromethane sulfonate/polyacrylonitrile composite was obtained. The weight ratio of lithium trifluoromethane sulfonate to polyacrylonitrile is 18:100. The dielectric permittivity-frequency curve, AC conductivity-frequency curve and dielectric loss-frequency curve of the composite are shown in FIGS. 4, 5 and 6, respectively.

As shown in FIG. 4, it shows dielectric permittivities at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention. lithium trifluoromethane sulfonate/polyacrylonitrile composite prepared in Control Example 3 of this invention has the highest dielectric permittivity, which is 14980 at 100 Hz. Over the whole frequency range, lithium trifluoromethane sulfonate/polyacrylonitrile/epoxy resin composites prepared in Embodiment 1, 2 and 3 of this invention have higher dielectric permittivities than polyacrylonitrile/epoxy resin blend prepared in Control Example 1 of this invention and lithium trifluoromethane sulfonate/epoxy resin composite prepared in Control Example 2 of this invention. The dielectric permittivity at 100 Hz of lithium trifluoromethane sulfonate/polyacrylonitrile/epoxy resin composites prepared in Embodiment 1 is 18, about 3.7 and 3.2 times of that of polyacrylonitrile/epoxy resin blend prepared in Control Example 1 of this invention and lithium trifluoromethane sulfonate/epoxy resin composite prepared in Control Example 2 of this invention, respectively.

As shown in FIG. 5, it shows AC electrical conductivities at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention. the conductivity-frequency curve of lithium trifluoromethane sulfonate/polyacrylonitrile composite prepared in Control Example 3 exhibits a conductor characteristic and other curve exhibit insulator characteristics, which is the reason why Control Example 3 has the highest dielectric permittivity. At the same frequency, the conductivities of lithium trifluoromethane sulfonate/polyacrylonitrile/epoxy resin composites prepared in Embodiment 1, 2 and 3 of this invention are higher than that of Control Example 1 and of this invention.

As shown in FIG. 6, it shows dielectric losses at different frequencies for lithium trifluoromethane sulfonate/polyacrylonitrile/epoxy resin composites prepared in Embodiment 1, 2 and 3 of this invention, polyacrylonitrile/epoxy resin blend prepared in Control Example 1 of this invention, lithium trifluoromethane sulfonate/epoxy resin composite prepared in Control Example 2 of this invention, lithium trifluoromethane sulfonate/polyacrylonitrile composite prepared in Control Example 3 of this invention. Control Example 3 of this invention shows high dielectric loss, which is because of the fact that it is conductor. While lithium trifluoromethane sulfonate/polyacrylonitrile/epoxy resin composites prepared in Embodiment 1, 2 and 3 of this invention have lower dielectric loss cause epoxy resin was evenly distributed over lithium trifluoromethane sulfonate/polyacrylonitrile, and the conductive network is cut off, reducing the contact among conductors to reduce the leakage current.

Embodiment 4

1) Preparation of Lithium Trifluoromethane Sulfonate/Polyacrylonitrile Solution 5 g polyacrylonitrile and 29 mL N,N-dimethylformamide were blended with stirring for 1 h at 80° C. to get a uniform and transparent polyacrylonitrile solution (A); 0.4 g lithium trifluoromethane sulfonate was added into the polyacrylonitrile solution (A) with stirring for 1 h at 80° C. to obtain a uniform and transparent lithium trifluoromethane sulfonate/polyacrylonitrile solution.

2) Preparation of Lithium Trifluoromethane Sulfonate/Polyacrylonitrile/Epoxy Resin Composite 1 g epoxy resin (The commercial code is E-51) was stirred for 30 min at 60° C., and then blended with 0.04 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 15° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 15° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 20:8:100.

Embodiment 5

1) Preparation of Lithium Trifluoromethane Sulfonate/Polyacrylonitrile Solution

Solution of lithium trifluoromethanesulfonate/polyacrylonitrile was prepared according to the Embodiment 4.

2) Preparation of Lithium Trifluoromethane Sulfonate/Polyacrylonitrile/Epoxy Resin Composite 2 g epoxy resin (The commercial code is E-51) was stirred for 30 min at 60° C., and then blended with 0.08 g 2-ethyl-4-methylinidazole with stirring for 10 min to get a uniform and transparent epoxy resin mixture, into which lithium trifluoromethane sulfonate/polyacrylonitrile solution prepared by step (1) was added with stirring at 15° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 15° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 40:8:100.

Embodiment 6

1) Preparation of Lithium Trifluoromethane Sulfonate/Polyacrylonitrile Solution

Solution of lithium trifluoromethanesulfonate/polyacrylonitrile was prepared according to the Embodiment 4.

2) Preparation of Lithium Trifluoromethane Sulfonate/Polyacrylonitrile/Epoxy Resin Composite 2.5 g epoxy resin (The commercial code is E-51) was stirred for 30 min at 60° C., and then blended with 0.1 g 2-ethyl-4-methylinidazole with stirring for 10 min to get a uniform and transparent EP mixture, into which lithium trifluoromethane sulfonate/polyacrylonitrile solution prepared by step (1) was added with stirring at 15° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 15° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 50:8:100.

Embodiment 7

1) Preparation of Lithium Trifluoromethane Sulfonate/Polyacrylonitrile Solution 5 g polyacrylonitrile and 40 mL N,N-dimethylformamide were blended with stirring for 4 h at 40° C. to get a uniform and transparent polyacrylonitrile solution (A); 1.25 g lithium trifluoromethane sulfonate was added into the polyacrylonitrile solution (A) with stirring for 4 h at 40° C. to obtain a uniform and transparent lithium trifluoromethane sulfonate/polyacrylonitrile solution.

2) Preparation of Lithium Trifluoromethane Sulfonate/Polyacrylonitrile/Epoxy Resin Composite 1 g epoxy resin (The commercial code is E-51) was stirred for 30 min at 60° C., and then blended with 0.04 g 2-ethyl-4-methylinidazole with stirring for 10 min to get a uniform and transparent epoxy resin mixture, into which lithium trifluoromethane sulfonate/polyacrylonitrile solution prepared by step (1) was added with stirring at 30° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 30° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 20:25:100.

Embodiment 8

1) Preparation of Lithium Trifluoromethane Sulfonate/Polyacrylonitrile Solution

Solution of lithium trifluoromethanesulfonate/polyacrylonitrile was prepared according to the Embodiment 7.

2) Preparation of Lithium Trifluoromethane Sulfonate/Polyacrylonitrile/Epoxy Resin Composite 2 g epoxy resin (The commercial code is E-51) was stirred for 30 min at 60° C., and then blended with 0.08 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 30° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 30° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 40:25:100.

Embodiment 9

1) Preparation of Lithium Trifluoromethane Sulfonate/Polyacrylonitrile Solution

Solution of lithium trifluoromethanesulfonate/polyacrylonitrile was prepared according to the Embodiment 7.

2) Preparation of Lithium Trifluoromethane Sulfonate/Polyacrylonitrile/Epoxy Resin Composite 2.5 g epoxy resin (The commercial code is E-51) was stirred for 30 min at 60° C., and then blended with 0.1 g 2-ethyl-4-methylimirdazole with stirring for 10 min to get a uniform and transparent epoxy resin mixture, into which lithium trifluoromethane sulfonate/polyacrylonitrile solution prepared by step (1) was added with stirring at 30° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 30° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 50:25:100.

Embodiment 10

1) Preparation of Lithium Trifluoromethane Sulfonate/Polyacrylonitrile Solution 5 g polyacrylonitrile and 58 mL N,N-dimethylformamide were blended with stirring for 6 h at 25° C. to get a uniform and transparent polyacrylonitrile solution (A); 1.8 g lithium trifluoromethane sulfonate was added into the polyacrylonitrile solution (A) with stirring for 6 h at 25° C. to obtain a uniform and transparent lithium trifluoromethane sulfonate/polyacrylonitrile solution.

2) Preparation of Lithium Trifluoromethane Sulfonate/Polyacrylonitrile/Epoxy Resin Composite 1 g epoxy resin (The commercial code is E-51) was stirred for 30 min at 60° C., and then blended with 0.04 g 2-ethyl-4-methylinidazole with stirring for 10 min to get a uniform and transparent epoxy resin mixture, into which lithium trifluoromethane sulfonate/polyacrylonitrile solution prepared by step (1) was added with stirring at 50° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 50° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 20:36:100.

Embodiment 11

1) Preparation of Lithium Trifluoromethane Sulfonate/Polyacrylonitrile Solution

Solution of lithium trifluoromethanesulfonate/polyacrylonitrile was prepared according to the Embodiment 10.

2) Preparation of Lithium Trifluoromethane Sulfonate/Polyacrylonitrile/Epoxy Resin Composite 2 g epoxy resin (The commercial code is E-51) was stirred for 30 min at 60° C., and then blended with 0.08 g 2-ethyl-4-methylimidazole with stirring for 10 min to get a uniform and transparent epoxy resin mixture, into which lithium trifluoromethane sulfonate/polyacrylonitrile solution prepared by step (1) was added with stirring at 50° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 50° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 40:36:100.

Embodiment 12

1) Preparation of Lithium Trifluoromethane Sulfonate/Polyacrylonitrile Solution

Solution of lithium trifluoromethanesulfonate/polyacrylonitrile was prepared according to the Embodiment 10.

2) Preparation of Lithium Trifluoromethane Sulfonate/Polyacrylonitrile/Epoxy Resin Composite 2.5 g epoxy resin (The commercial code is E-44) was stirred for 30 min at 60° C., and then blended with 0.1 g 2-ethyl-4-methyliiridazole with stirring for 10 min to get a uniform and transparent epoxy resin mixture, into which lithium trifluoromethane sulfonate/polyacrylonitrile solution prepared by step (1) was added with stirring at 50° C. for 12 h to produce a uniform and transparent lithium trifluoromethane sulfonate/polyacrylonitrile/epoxy resin solution.

The lithium trifluoromethane sulfonate/polyacrylonitrile/epoxy resin solution was poured into a mold through tape casting, and the solvent was total volatilized under vacuum at 50° C., after that the mold was put into an oven for curing and postcuring with the procedures of 80° C./2 h+100° C./2 h+120° C./2 h and 140° C./4 h, successively, and lithium trifluoromethane sulfonate/polyacrylonitrile/epoxy resin composite was obtained. The weight ratio of epoxy resin: lithium trifluoromethane sulfonate:polyacrylonitrile is 50:36:100.

Embodiment 13

1) Preparation of Lithium Bis(Trifluoromethane Sulfonimide)/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium bis(trifluoromethane sulfonimide) was added into the polyacrylonitrile solution (A) with stirring for 2 h at 60° C. to obtain a uniform and transparent lithium bis(trifluoromethane sulfonimide)/polyacrylonitrile solution.

2) Preparation of Lithium Bis(Trifluoromethane Sulfonimide)/Polyacrylonitrile/Epoxy Resin Composite 1.65 g epoxy resin (The commercial code is E-51) was stirred for 30 min at 60° C., and then blended with 0.066 g 2-ethyl-4-methylimidazole with stirring for 10 min to get a uniform and transparent epoxy resin mixture, into which lithium bis(trifluoromethane sulfonimide)/polyacrylonitrile solution prepared by step (1) was added with stirring at 25° C. for 12 h to produce a uniform and transparent lithium bis(trifluoromethane sulfonimide)/polyacrylonitrile/epoxy resin solution.

The lithium bis(trifluoromethane sulfonimide)/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium bis(trifluoromethane sulfonimide)/polyacrylonitrile/epoxy resin composite was obtained. The weight ratio of epoxy resin:lithium bis(trifluoromethane sulfonimide):polyacrylonitrile is 33:18:100.

Embodiment 14

1) Preparation of Lithium Tetrafluoroborate/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium tetrafluoroborate was added into the polyacrylonitrile solution (A) with stirring for 2 h at 60° C. to obtain a uniform and transparent lithium tetrafluoroborate/polyacrylonitrile solution.

2) Preparation of Lithium Tetrafluoroborate/Polyacrylonitrile/Epoxy Resin Composite 1.65 g epoxy resin (The commercial code is E-44) was stirred for 30 min at 60° C., and then blended with 0.066 g 2-ethyl-4-methylimidazole with stirring for 10 min to get a uniform and transparent epoxy resin mixture, into which lithium tetrafluoroborate/polyacrylonitrile solution prepared by step (1) was added with stirring at ° C. for 12 h to produce a uniform and transparent lithium tetrafluoroborate/polyacrylonitrile/epoxy resin solution.

The lithium tetrafluoroborate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium tetrafluoroborate/polyacrylonitrile/epoxy resin composite was obtained. The weight ratio of epoxy resin:lithium tetrafluoroborate:polyacrylonitrile is 33:18:100.

Embodiment 15

1) Preparation of Lithium Hexafluorophosphate/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium hexafluorophosphate was added into the polyacrylonitrile solution (A) with stirring for 2 h at 60° C. to obtain a uniform and transparent lithium hexafluorophosphate/polyacrylonitrile solution.

2) Preparation of Lithium Hexafluorophosphate/Polyacrylonitrile/Epoxy Resin Composite 1.65 g epoxy resin (The commercial code is E-51) was stirred for 30 min at 60° C., and then blended with 0.066 g 2-ethyl-4-methylimidazole with stirring for 10 min to get a uniform and transparent epoxy resin mixture, into which lithium hexafluorophosphate/polyacrylonitrile solution prepared by step (1) was added with stirring at 25° C. for 12 h to produce a uniform and transparent lithium hexafluorophosphate/polyacrylonitrile/epoxy resin solution.

The lithium hexafluorophosphate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium hexafluorophosphate/polyacrylonitrile/epoxy resin composite was obtained. The weight ratio of epoxy resin:lithium hexafluorophosphate:polyacrylonitrile is 33:18:100.

Embodiment 16

1) Preparation of Lithium Perchlorate/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium perchlorate was added into the polyacrylonitrile solution (A) with stirring for 2 h at 60° C. to obtain a uniform and transparent lithium perchlorate/polyacrylonitrile solution.

2) Preparation of Lithium Perchlorate/Polyacrylonitrile/Epoxy Resin Composite 1.65 g epoxy resin (The commercial code is E-51) was stirred for 30 min at 60° C., and then blended with 0.066 g 2-ethyl-4-methylinidazole with stirring for 10 min to get a uniform and transparent epoxy resin mixture, into which lithium perchlorate/polyacrylonitrile solution prepared by step (1) was added with stirring at 25° C. for 12 h to produce a uniform and transparent lithium perchlorate/polyacrylonitrile/epoxy resin solution.

The lithium perchlorate/polyacrylonitrile/epoxy resin solution was poured into a mold through tape casting, and the solvent was total volatilized under vacuum at 25° C., after that the mold was put into an oven for curing and postcuring with the procedures of 80° C./2 h+100° C./2 h+120° C./2 h and 140° C./4 h, successively, and lithium perchlorate/polyacrylonitrile/epoxy resin composite was obtained. The weight ratio of epoxy resin:lithium perchlorate:polyacrylonitrile is 33:18:100.

Embodiment 17

1) Preparation of Lithium Trifluoromethane Sulfonate/Polyacrylonitrile Solution 5 g polyacrylonitrile and 50 mL N,N-dimethylformamide were blended with stirring for 2 h at 60° C. to get a uniform and transparent polyacrylonitrile solution (A); 0.9 g lithium trifluoromethane sulfonate was added into the polyacrylonitrile solution (A) with stirring for 2 h at 60° C. to obtain a uniform and transparent lithium trifluoromethane sulfonate/polyacrylonitrile solution.

2) Preparation of Lithium Trifluoromethane Sulfonate/Polyacrylonitrile/Epoxy Acrylate Resin Composite 1.65 g epoxy acrylate resin was stirred for 30 min at 100° C., and then blended with 0.0165 g Methyl ethyl ketone peroxide with stirring for 10 min to get a uniform and transparent epoxy acrylate resin mixture, into which lithium trifluoromethane sulfonate/polyacrylonitrile solution prepared by step (1) was added with stirring at 25° C. for 12 h to produce a uniform and transparent lithium trifluoromethane sulfonate/polyacrylonitrile/epoxy acrylate resin solution.

The lithium trifluoromethane sulfonate/polyacrylonitrile/epoxy acrylate resin solution was poured into a mold through tape casting, and the solvent was total volatilized under vacuum at 25° C., after that the mold was put into an oven for curing and postcuring with the procedures of 150° C./2 h and 180° C./4 h, successively, and lithium trifluoromethane sulfonate/polyacrylonitrile/epoxy acrylate resin composite was obtained. The weight ratio of epoxy acrylate resin:lithium trifluoromethane sulfonate:polyacrylonitrile is 33:18:100.

What we claim:

1. A preparation method of lithium salt/polyacrylonitrile/thermosetting resin composites wherein comprising the following steps:
   (1) by mass, 100 parts of polyacrylonitrile and 500 to 1100 parts of N,N-dimethylformamide are stirred at 25 to 80° C. to obtain a uniform and transparent polyacrylonitrile solution A; 8 to 36 parts of a lithium salt are added into the polyacrylonitrile solution A, and the mixture is stirred at 25 to 80° C. until a uniform and transparent lithium salt/polyacrylonitrile solution is obtained;
   (2) a heat-curable resin is added into the lithium salt/polyacrylonitrile solution prepared by step (1), and mixed uniformly at a temperature of 15 to 50° C. to obtain a composite solution; after the composite solution is made into a thin film, the thin film is further cured and post-processed to obtain a lithium salt/polyacrylonitrile/thermosetting resin composite.

2. The preparation method of lithium salt/polyacrylonitrile/thermosetting resin composites according to claim 1, wherein said lithium salt includes one selected from lithium trifluoromethane sulfonate, lithium bis(trifluoromethane sulfonimide), lithium tetrafluoroborate, lithium hexafluorophosphate, lithium perchlorate.

3. The preparation method of lithium salt/polyacrylonitrile/thermosetting resin composites according to claim 1, wherein said heat-curable resin is an epoxy resin comprising a curing agent or an epoxy acrylate resin.

4. The preparation method of lithium salt/polyacrylonitrile/thermosetting resin composites according to claim 3, wherein said curing agent is 2-ethyl-4-methylimidazole.

5. The preparation method of lithium salt/polyacrylonitrile/thermosetting resin composites according to claim 1, wherein the thin film is further cured and post-proccessed in an oven with the procedures of 80° C./2 h+100° C./2 h+120° C./2 h and 140° C./4 h.

* * * * *